United States Patent [19]

Takenaka et al.

[11] 4,398,328

[45] Aug. 16, 1983

[54] ROLLS FOR SINGLE FACER

[75] Inventors: Hiroyuki Takenaka; Keiichi Katayama; Kouichi Tokiyasu, all of Hiroshima; Tadashi Hirakawa; Hiroaki Sasashige, both of Mihara, all of Japan

[73] Assignee: Mitsubishi Jukogyo Kabushiki Kaisha, Tokyo, Japan

[21] Appl. No.: 277,155

[22] Filed: Jun. 25, 1981

[30] Foreign Application Priority Data

Jun. 27, 1980 [JP] Japan .................................. 55-87454

[51] Int. Cl.³ ............................................. B21B 27/02
[52] U.S. Cl. ........................................ 29/126; 29/127; 29/128
[58] Field of Search .................................. 29/126–128

[56] References Cited

FOREIGN PATENT DOCUMENTS 486925  6/1938  United Kingdom .................. 29/126
289158  2/1971  U.S.S.R. ................................. 29/126

OTHER PUBLICATIONS

Primary Examiner—Eugene F. Desmond
Attorney, Agent, or Firm—Bernard, Rothwell & Brown

[57] ABSTRACT

The interior wall of a hollow corrugating roll or a hollow pressure roll of a single facer is frictionally engaged by a resilient member so as to minimize the elastic vibration thereof and thereby to minimize the noise developed and transmitted during operation of the single facer. The resilient member is positioned within the hollow interior of the roll and is arranged to press against the interior wall as a result of its resilience and thereby to reduce the elastic vibration of the roll and the noise transmitted. The resilient member may take various forms, such as a coiled helical spring, a coiled leaf spring, a plurality of tapered nested annular members engaging the interior wall of the roll, et cetera.

7 Claims, 10 Drawing Figures

ROLLS FOR SINGLE FACER

BACKGROUND OF THE INVENTION

1. Field of the Invention

This invention relates to single facers for manufacturing single-faced corrugated paper and more particularly to improved construction of the rolls employed in single facers.

2. Description of the Prior Art

Much progress has been made in recent years in techniques for speeding up the manufacturing operation for making corrugated paper. A single facer (a machine for manufacturing single-faced corrugated paper) is one of the important machines employed in a corrugated paper manufacturing operation and one in which a higher speed of operation is desirable. In achieving such higher speed operation it is necessary to overcome a number of technical problems. One such problem is that to achieve a higher speed operation wherein the paper moves more rapidly over the surface of the corrugating rolls and the pressure roll of a single facer, it is necessary that heat be transferred more rapidly from the interior of the roll, to which heated vapor is normally supplied, to the exterior surface of the roll so as to adequately heat the paper. In the usual single facer, high pressure heated vapor is introduced into the interior of the hollow upper and lower corrugating rolls and the hollow pressure roll to heat a core sheet or a liner moving in contact with the outer circumferential surfaces of these rolls, to thereby improve the corrugating capability and the passing and bonding capability of the rolls. As the speed of the single facer is increased and, hence, the speed with which the core sheet and liner pass over the surface of the rolls is increased, the amount of heat that can be transferred to a given section of paper moving over the roll through a wall of given thickness is reduced. The rate of heat transfer can be increased to correspond to the increased speed of the paper over the exterior surface of the rolls by reducing the thickness of the wall of each of the rolls. Unfortunately, it has been found that reducing the thickness of the rolls to accomplish greater heat transfer gives rise to another problem, namely, that the thinner-walled rolls tend to have an increased amount of vibration and an increase in noise transmitted thereby. Thus, this decrease in thickness of the wall of the hollow rolls resulted in the occurrence of a metallic noise of increased loudness. It has heretofore been considered that the noise generated by a single facer results mainly from the vibration of a rigid body, that is, vibration occurring when a bending vibration load on a roll generated as a result of a driving load between rolls works as a returning force generated by a roll-supporting bearing which functions as a spring. The occurrence of metallic noise of increased loudness referred to above was analyzed to discover that the noise level increases were due to elastic vibration rather than vibration of a rigid body as discussed above. This elastic vibration means vibration occurring on the basis of the deformation of the roll itself. The higher noise level, therefore, can be ascribed to an increase in the level of elastic vibration of the thinner roll shells and an increase in the level of high frequency vibration caused thereby. The increase in the loudness of noise occurring during a corrugating operation using rolls having walls of reduced thickness is particularly noticeable in the region of a high-speed operation.

Figure 3:
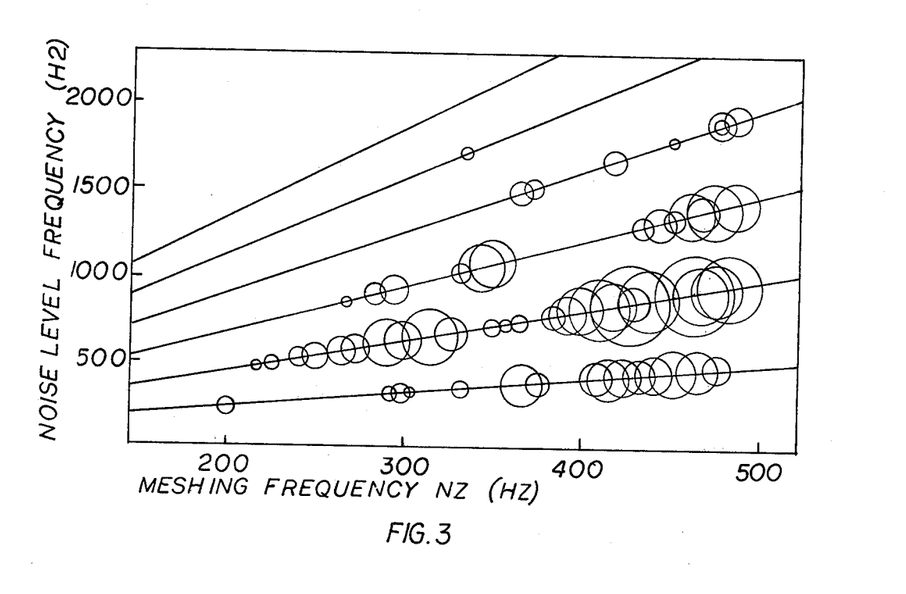
FIG. 3 is a diagram showing the relation between meshing frequencies and the frequencies of noise level in an ordinary single facer.

The nature of the generated noise may be better appreciated by reference to FIG. 3 which illustrates a so-called Campbell's diagram showing the results of analysis of actual measurements of noise generated by a single facer having a pressure roll with a diameter of 500 mm, a length of 2,200 mm, and a roll wall thickness of 25 mm. This diagram shows the amplitude of the noise by the diameter of the circle for each noise frequency and for overall range of meshing frequency, which is generated when the tips of the corrugations on the lower corrugating roll are beaten by the pressure roll.

Figure 4:
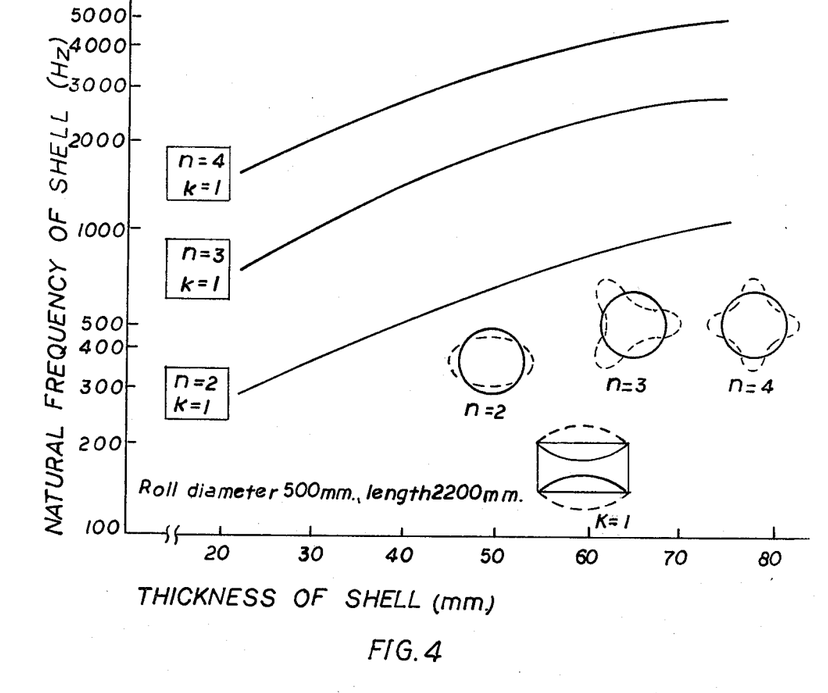
FIG. 4 is a diagram showing the relation between the thickness of a hollow cylindrical roll shell and the natural frequencies thereof.

As may be noted from this diagram, the noise level becomes high at specific noise frequencies, for example, around 300–500 Hz, 800 Hz, 1500 Hz. These frequencies agree with the natural frequencies (in a mode of $K=1$, $N=2-4$) of a hollow cylindrical shell, as shown in FIG. 4. This means that metallic and discordant noise occurs when natural vibration in the above-mentioned mode takes place due to the meshing frequency NZ and its higher harmonics. The natural frequency of a hollow cylindrical shell is generally decreased as the thickness of the shell is decreased, but at the higher or second resonance speed, that is at the second harmonic, a larger amplitude occurs depending on the changing damping factor, and this yields undesirable metallic noise. Therefore, attempts to improve the heat transfer rate of a roll by conventional technique to increase the speed of operation, that is, by reducing the thickness of the wall of the roll, gives rise, for the above-discussed reasons, to a problem of an increase in the loudness of the noise.

It is an object of the present invention to provide a single facer having an upper corrugating roll, a lower corrugating roll and a pressure roll so constructed that rolls having thinner walls for greater heat transfer may be employed, but further constructed so that the noise transmitted during the operation of the single facer is minimized.

It is a further object of the present invention to minimize the elastic vibration of the rolls and thereby minimize the noise resulting from such elastic vibration.

SUMMARY OF THE INVENTION

In carrying out the invention in one form thereof, provision is made for frictionally engaging the interior wall of a hollow corrugating roll or a hollow pressure roll of a single facer so as to minimize the elastic vibration thereof and thereby to minimize the noise developed and transmitted during operation of the single facer. A resilient member is positioned within the hollow interior of the roll and is arranged to press against the interior wall as a result of its resilience and thereby to reduce the elastic vibration of the roll and the noise transmitted. The resilient member may take various forms, such as a coiled helical spring, a coiled leaf spring, a plurality of tapered nested annular members engaging the interior wall of the roll, et cetera. In still another form of the invention, these annular members may be split to facilitate the resilient frictional engagement with the interior wall.

BRIEF DESCRIPTION OF THE DRAWINGS

In the drawings:

FIG. 6b is a longitudinal sectional view of the roll structure illustrated in FIG. 6a.

FIG. 7b is a perspective view of one of the noise-attenuating members shown in FIG. 7a.

FIG. 7c is a perspective view of a modified form of noise-attenuating member usable in the construction shown in FIG. 7a.

DETAILED DESCRIPTION OF THE PREFERRED EMBODIMENTS

Figure 1:
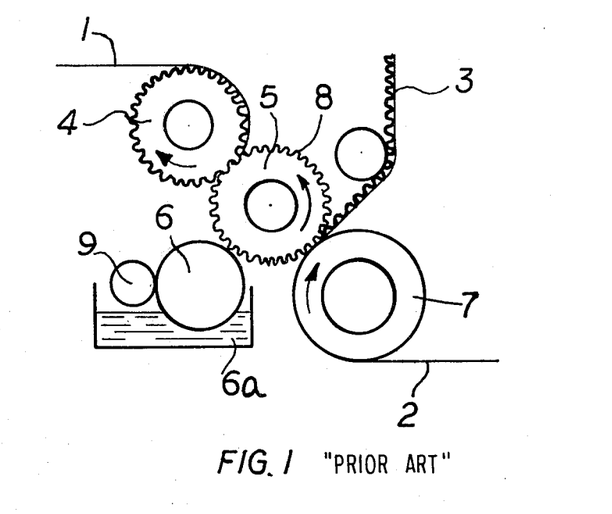
FIG. 1 is a schematic illustration of a single facer with which the invention of this application may be employed.

Referring first to FIG. 1, there is shown the general arrangement of a conventional single facer. The single facer continuously manufactures single-faced corrugating paper 3 by corrugating a sheet of paper referred to as a core sheet 1 into a corrugated sheet and then bonding another sheet of paper called a liner 2 to the corrugated sheet. The apparatus includes an upper corrugating roll 4, a lower corrugating roll 5 which meshes with the upper corrugating roll 4 to effect corrugation of the sheet 1, and a pressure roll 7 which is urged against the lower corrugating roll to effect bonding of the liner 2 to the corrugated sheet. The corrugating rolls 4 and 5 are formed on the exterior surface to provide a plurality of axially extending meshing teeth 8. The apparatus further includes a pasting roll 6 which rides partially within a paste-containing vessel 6a for applying paste to the tips of the corrugated paper riding along the surface of the lower corrugating roll 5, and a doctor roll 9 for controlling the paste on the pasting roll 6.

Figure 2:
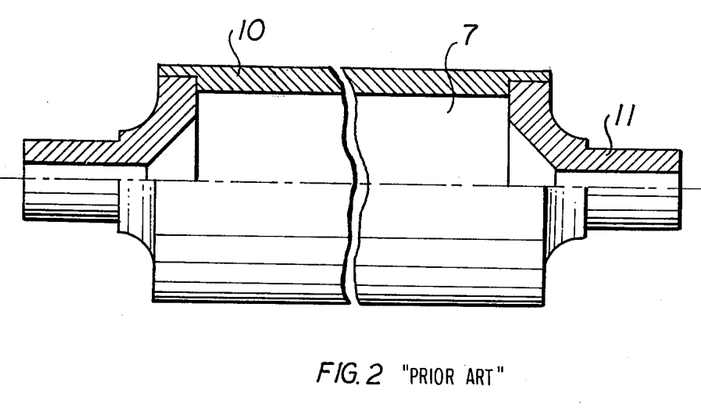
FIG. 2 is a partial sectional view of a conventional prior art roll employed in a single facer.

The two corrugating rolls 4 and 5 and the pressure roll 7 are all formed as hollow cylinders. One of these rolls, the pressure roll 7, is shown in FIG. 2. As there illustrated, the roll is formed as a hollow, generally cylindrical structure including a roll shell 10. Shaft ends 11 extend from each end of the shell 10 for rotatably supporting the roll by means of suitable bearings (not shown). The upper and lower corrugating rolls 4 and 5 have basically the same construction as the pressure roll 7 illustrated except that each of these rolls 4, 5 has plurality of axially extending teeth 8 on the outer circumferential surface thereof for effecting the aforementioned corrugation of the sheet passing through the nip between the corrugating rolls. Heated high-pressure vapor, such as steam, is generally introduced into the hollow interior of the upper and lower corrugating rolls and of the pressure roll. The heat of this vapor is transmitted through the roll shells to maintain the exterior surfaces of the rolls at a high temperature. This assists in the corrugating of the sheet 1 and in the bonding of the sheet 1 to the liner 2.

In manufacturing single-faced corrugated paper in apparatus of this general type, the core sheet 1 is heated and moistened as it passes a mill roll stand (not shown), a preheating roll (not shown), and a moistener (not shown), all of which are well known in the art, and is then directed to the upper corrugating roll 4. The core sheet 1 then passes through a narrow space or nip between the upper corrugating roll 4 and the lower corrugating roll 5 where the meshing teeth cause the sheet to be formed into alternating ridges and grooves, that is, to be corrugated. Thereafter, paste is applied to the tips of the corrugations by the pasting roll 6 and the sheet 1, with the paste applied thereto, passes between the lower corrugating roll 5 and the pressure roll 7 where the liner 2 is forced against the pasted tips of the corrugations and bonded thereto to form the single-faced corrugated paper.

Figure 5:
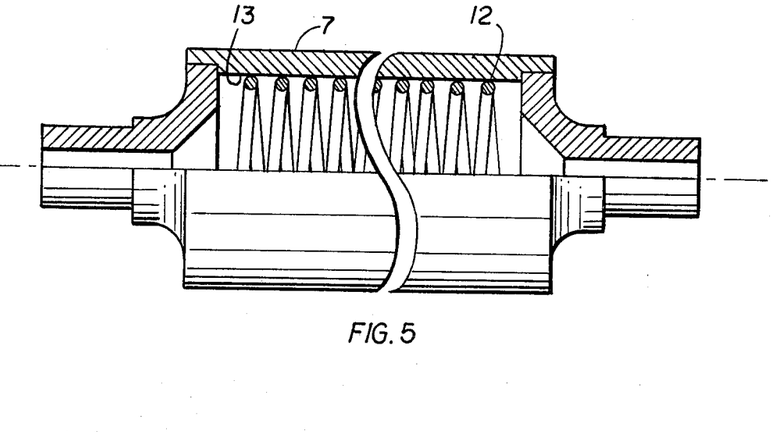
FIG. 5 is an elevation view partly in section of a roll incorporating one form of the structure of the present invention.

Turning now to FIG. 5, which illustrates one embodiment of this invention, there is shown a roll, which has been identified as a pressure roll 7, having a structure generally corresponding to that previously shown in FIG. 2. It will be understood that the structure of this invention is applicable also to the corrugating rolls 4 and 5, and normally the structure shown will be employed with both corrugating rolls 4 and 5 and pressure roll 7. As explained previously, where the roll shell 10 has been made of reduced thickness in order to facilitate more rapid heat transfer from the interior thereof to the exterior surface thereof in order to permit more rapid movement of paper thereover and, hence, to increase the speed of manufacture, this has resulted in increased vibration and resultant increased noise transmission. In accordance with the present invention, this disadvantage of the prior art has been overcome and the noise has been kept at an acceptable level despite the reduction in thickness of the wall of the roll shell by providing in the hollow interior of the roll a resilient attenuating member 12 which is pressed frictionally against substantially the entire interior wall 13 of the roll shell by the inherent resilience of this member. In the particular form of the invention shown in FIG. 5, the resilient member 12 is in the form of a helical coil spring, the outer circumferential surface of the coils of which is pressed against the interior wall 13 with a suitable contact pressure. For example, the pressure in the form of invention shown in FIG. 5, may be from 0.1 to 10 kg of force per $mm^2$. The coil spring is selected of a material and of a cross-sectional size so as to have suitable rigidity for effecting the necessary attenuating effect with respect to the elastic vibration of the roll discussed above. While a coil spring is shown in FIG. 5, other types of resilient members may be employed, for example, a plate spring or a leaf spring.

Figure 6A:
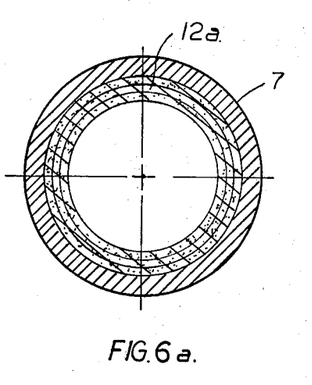
FIG. 6a is a transverse sectional view of a roll incorporating another form of the present invention.
Figure 6B:
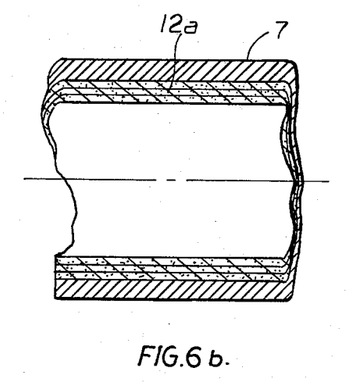

In FIGS. 6a and 6b, another such modified form of resilient member is shown. In the form of the invention there shown, the resilient attenuating element 12a comprises a wound or coiled resilient sheet or plate, the outer surface of which is resiliently pressed against substantially the entire interior wall of the roll at a suitable pressure in the same general manner as the coiled spring form of the invention shown in FIG. 5. As in the case of the form of invention shown in FIG. 5, the resilient member shown in FIGS. 6a and 6b is formed of a material having a strength and resilience which provides suitable contact pressure against the interior wall of the roll and suitable rigidity to accomplish the desired attenuating effect with respect to the particular size and wall thickness of the roll with which it is employed.

Figure 7A:
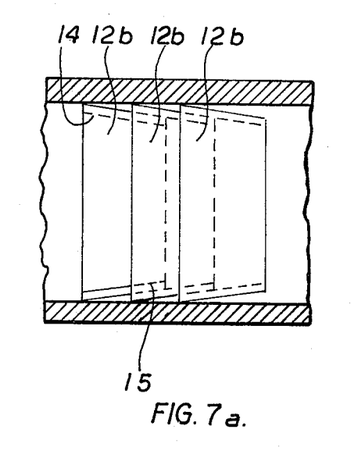
FIG. 7a is a longitudinal sectional view of a roll incorporating another modified form of this invention.
Figure 7B:
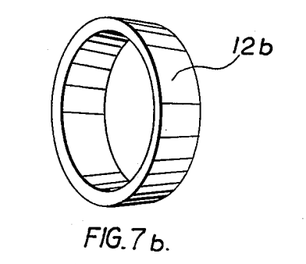

Another form of the invention is shown in FIGS. 7a and 7b. In this form of the invention, a plurality of individual attenuating members 12b are positioned in a particular manner within the hollow interior of the roll.

While for purposes of illustration only three such members have been shown, it will be understood that, like the forms of invention previously described, these members will extend substantially the full length of the hollow interior of the roll. Each of the members 12b is formed as a tapered annular member having one end 14 of larger diameter than the other end 15. The end 14 has an outer diameter which is slightly greater than the inner diameter of the roll so that when assembled within the roll, this surface of the annular member is pressed resiliently with suitable pressure against the interior wall of the roll. Each annular member is tapered toward the smaller diameter end 15 so that the plurality of annular members may be assembled in the nested relatonship sown in FIG. 7a. Thus, the outer diameter of the smaller end 15 is slightly less than the inner diameter of the larger end 14 so that the successive annular members may be assembled in the nested relationship shown.

Figure 7C:
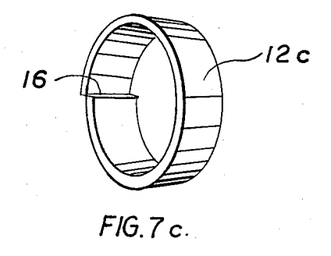

Still another form of the invention, which constitutes a modification of the structure shown in FIGS. 7a and 7b, is illustrated in FIG. 7c. The annular member 12c there shown is formed in the same general manner as the annular member 12b previously described with the exception that each member 12c is formed as a split ring, as illustrated at 16, to further facilitate assembly of the plurality of annular members within the hollow roll in position to exert suitable pressure against the interior wall thereof.

Each of the above-described attenuating members shown in FIGS. 5, 6 and 7, acts as a resisting force with respect to vibration, especially elastic vibration during the operation of the single facer, to provide a vibration-attenuating effect and thereby to reduce the noise level below that which would otherwise be present. By the construction of the present invention, it is made possible to reduce the thickness of the wall of the rolls of a single facer so as to provide more rapid heat transfer to the exterior surface and thereby to permit more rapid corrugated paper manufacture and at the same time to keep the noise emanating from the single facer during such manufacture at an acceptable level. If the attenuating elements are made hollow, it is then possible to insert therein vibration-restricting material comprising a powdered material, such as sand, or a liquid material, such as oil, to further increase the vibration-attenuating effect. Further, the attenuating elements may be covered at the outer circumferential surfaces with a heat-resisting material such as synthetic rubber. This further increases the vibration-attenuating effect but at some sacrifice in the heat transfer rate to the exterior surface of the roll.

It can be seen, from the above description, that a single facer constructed in accordance with this invention, which has a thin roll shell for obtaining an improved heat transfer rate and which includes resilient attenuating members for contacting the interior wall of the roll shell at a suitable pressure, provides a combined effect of more rapid heat transfer with a lowered noise level.

While specific embodiments of the invention have been shown and described, it will be understood that further modifications may be made, and it is intended by the appended claims to cover all such modifications as come within the spirit and scope of this invention.

It is claimed:

1. A roll for a single facer comprising:
   (a) a hollow cylinder having an interior wall;
   (b) a resilient attenuating member disposed within said hollow cylinder and engaging said interior wall along substantially the full length of said interior wall;
   (c) said member being urged by its resilience against said interior wall to reduce the vibration of the roll and the noise level of the single facer, whereby the wall of said cylinder may be made of reduced thickness while still keeping the noise at an acceptable level.

2. The roll of claim 1 wherein said resilient member comprises a coil spring.

3. The roll of claim 2 wherein the outer circumference of the coils of said coil spring engage said interior wall.

4. The roll of claim 1 wherein said resilient member comprises a coiled sheet, the outer surface of slaid coiled sheet being urged against said interior wall by the resilience of said member.

5. The roll of claim 1 wherein said resilient member comprises a plurality of annular members, each of said members having a maximum outer diameter slightly greater than the diameter of said interior wall, said annular members being urged by their resilience against the said interior wall.

6. The roll of claim 5 wherein:
   (a) each of said annular members is tapered, one end having said maximum outer diameter, and the other end having an outer diameter less than the inner diameter of said one end;
   (b) said tapered construction permitting assembly of said plurality of annular members in nested relationship, with the portion of maximum diameter of each of said members engaging said interior wall.

7. The roll of claim 5 wherein each of said annular members is split to facilitate assembly within said hollow cylinder in a vibration-attenuating and noise-attenuating position.

* * * * *